Figure 1:
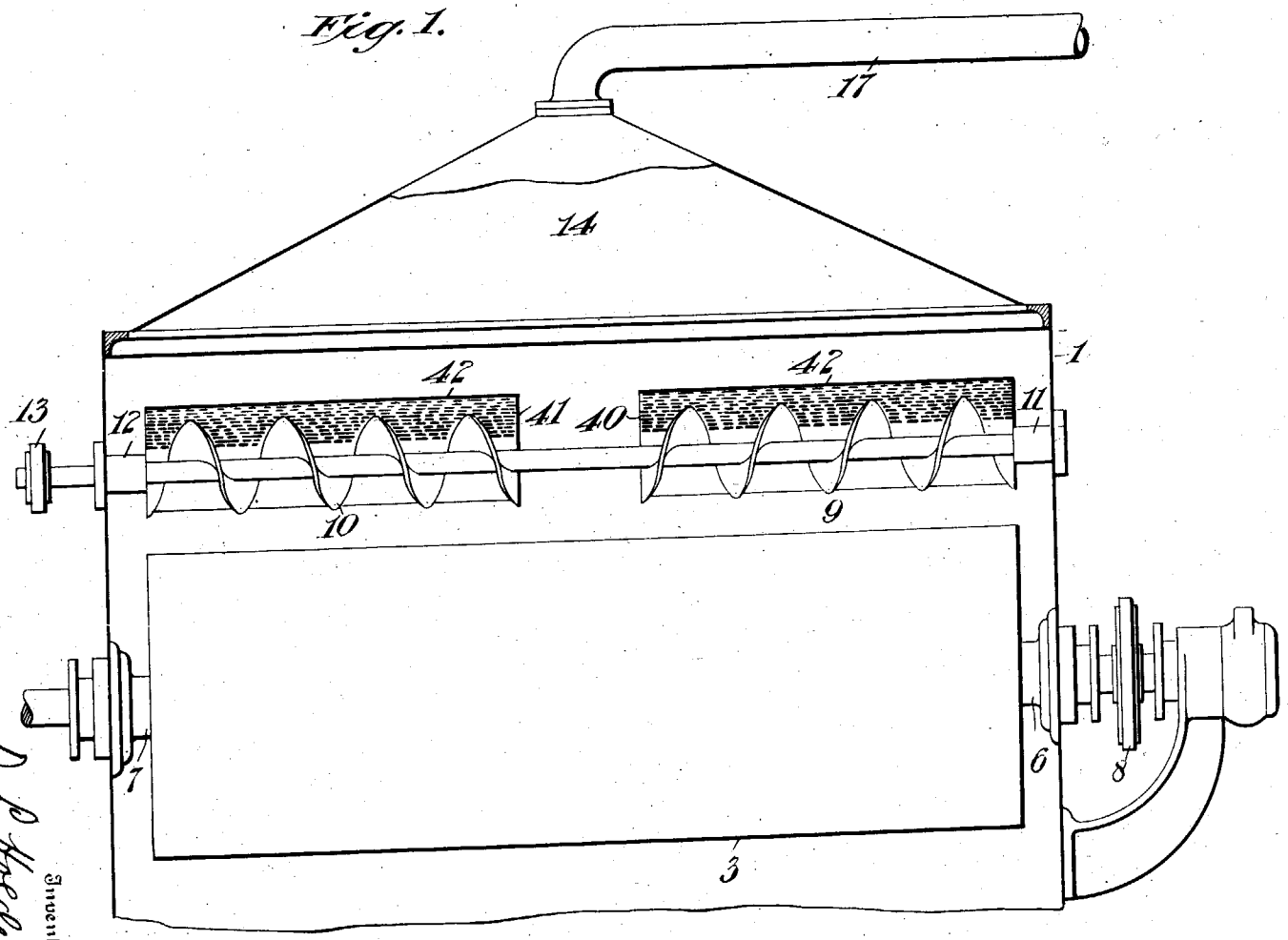

D. L. HOLDEN.

FREEZING CYLINDER FOR ICE MACHINES.

APPLICATION FILED MAR. 25, 1909.

Reissued Aug. 3, 1909.

13,002.

3 SHEETS—SHEET 1.

Witnesses

T. L. Macleane

D. V. Pierpoint

By

Inventor

D. L. Holden

Walter F. Rogers

Attorney

D. L. HOLDEN.
FREEZING CYLINDER FOR ICE MACHINES.
APPLICATION FILED MAR. 25, 1909.
Reissued Aug. 3, 1909.
13,002.
3 SHEETS—SHEET 2.
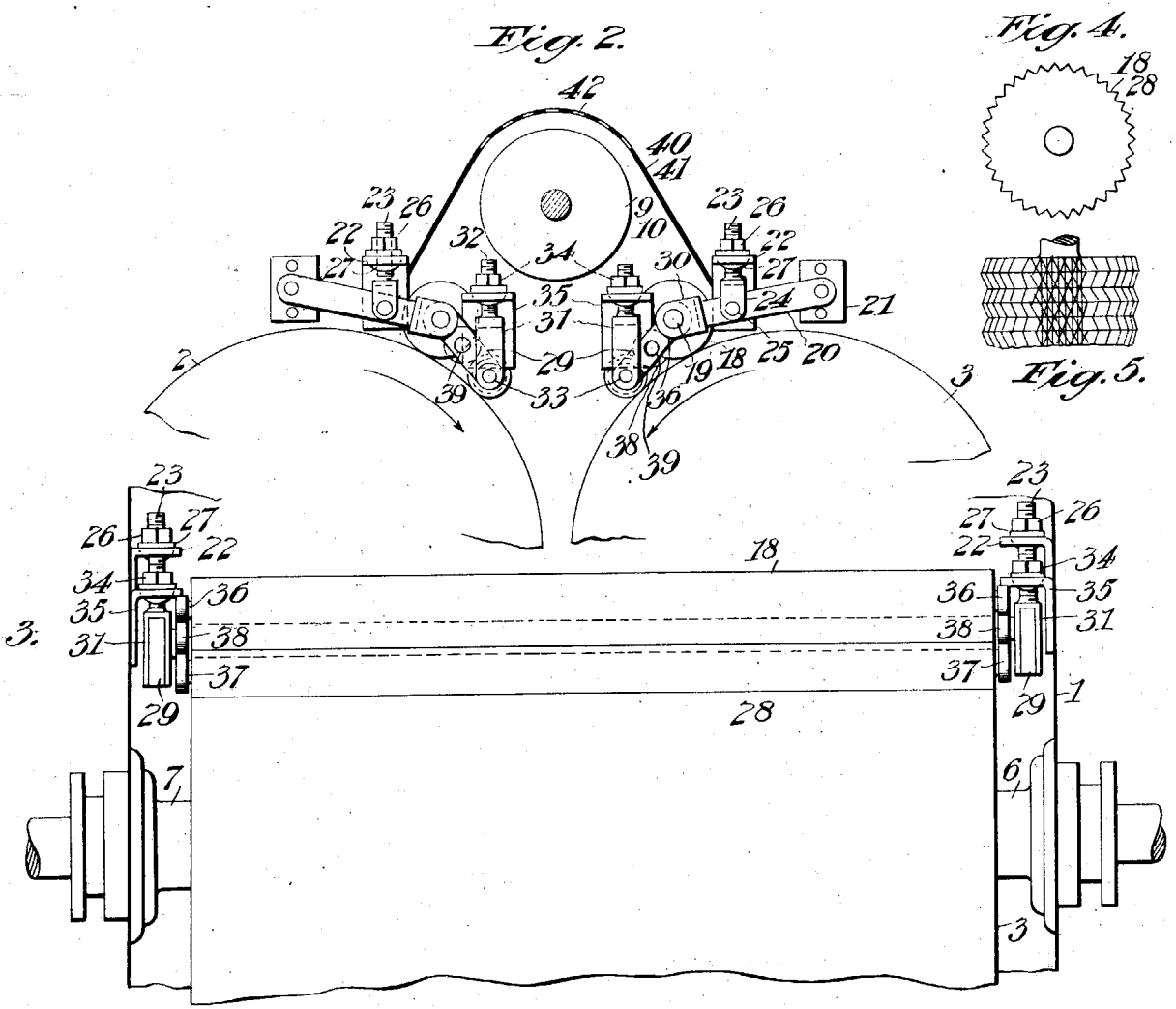
Witnesses
T. L. Mockabee
D. V. Pierpoint
Inventor
D. L. Holden
By
Walter F. Rogers
Attorney

D. L. HOLDEN.

FREEZING CYLINDER FOR ICE MACHINES.

APPLICATION FILED MAR. 25, 1909.

Reissued Aug. 3, 1909.

13,002.

3 SHEETS—SHEET 3.

Witnesses

F. L. Koehler

D. V. Pierpont

Inventor

D. L. Holden

By

Alvin F. Rogers

Attorney

UNITED STATES PATENT OFFICE.

DANIEL L. HOLDEN, OF NEW YORK, N. Y., ASSIGNOR, BY MESNE ASSIGNMENTS, TO FEDERAL ICE MACHINE COMPANY, A CORPORATION OF MAINE.

FREEZING-CYLINDER FOR ICE-MACHINES.

No. 13,002. Specification of Reissued Letters Patent. Reissued Aug. 3, 1909.

Original No. 865,040, dated September 3, 1907, Serial No. 314,611. Application for reissue filed March 25, 1909. Serial No. 485,864.

*To all whom it may concern:*

Be it known that I, DANIEL L. HOLDEN, a citizen of the United States, residing at New York, in the borough of Manhattan, county of New York, and State of New York, have invented certain new and useful Improvements in Freezing-Cylinders for Ice-Machines; and I do hereby declare the following to be a full, clear, and exact description of the invention, such as will enable others skilled in the art to which it appertains to make and use the same.

The object of this invention is to construct a machine for the rapid production of ice particles to be used in a regealing process. There are arranged multiple pairs of horizontally rotatable freezing cylinders in a clear water tank, with means to chip from the adjacent surfaces of each pair of cylinders their adhering ice coats, in minute particles; to convey the particles to the center of the tank, under a dome over each pair of cylinders which has, at its apex, a connection to a pump (not shown) which sucks up the ice particles and passes them to presses where they are pressed and regealed into blocks of merchantable size. It must be understood that the cylinders are charged with freezing material; that multiple pairs of cylinders are employed to insure a great output; that for smaller capacity plants a single pair of cylinders, or even a single cylinder, might supply the needed quantity of ice particles, using the same methods as shown.

The invention is illustrated in the accompanying drawings in which similar reference characters apply to and designate the same parts, wherever shown, in which,—

Figure 6:
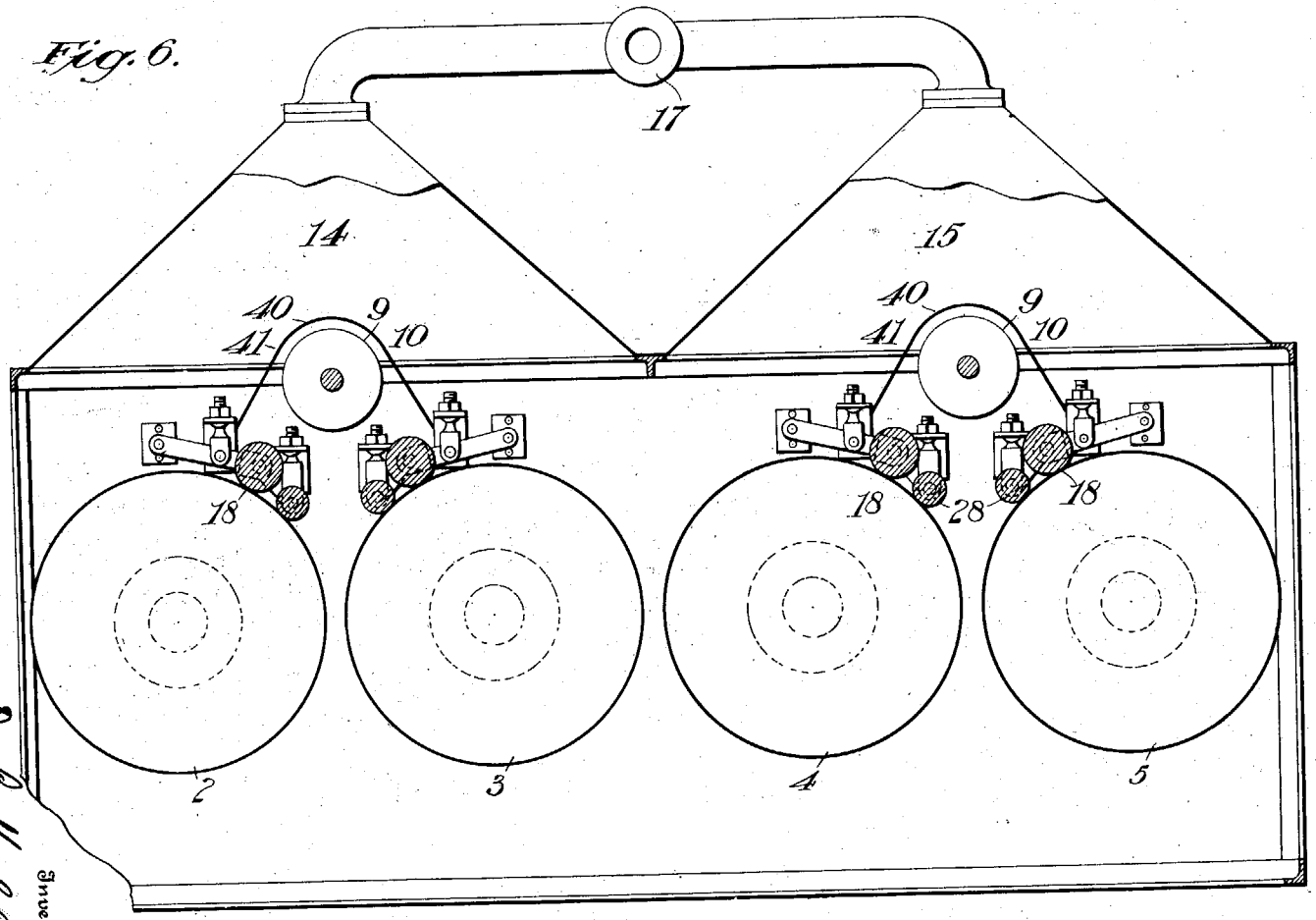

Figure 1 is a section of the tank with a freezing cylinder rotatably located therein, with the right and left screws to force the ice particles to the center of the tank, under the dome, and hoods over the screws to retain the particles in contact with the screws. Fig. 2 is a partial end view of a pair of cylinders, with their intervening screw conveyer for the ice particles, the hood over the conveyer, and the means for chipping the ice particles from the cylinders; Fig. 3 is a longitudinal elevation of a freezing cylinder and the means for chipping the adhering ice from its surface; Fig. 4 is an end view of a chipping roller; Fig. 5 is a fragmentary elevation of a chipping roller; Fig. 6 shows the freezing cylinders as arranged in pairs, in a tank, with a dome central over their adjacent sides, with their screws, chipping rollers and hoods.

Within a suitable tank 1 cylinders 2, 3, 4, 5 are mounted on bearings 6, 7 for rotary movement, the cylinders being arranged in pairs, and as many duplications of the pairs of cylinders may be employed as are necessary to furnish the quantity of spicules or ice particles which will adequately supply the presses (not shown) of a complete equipment. The cylinders are rotated by a chain on the sprocket wheel 8, or by other suitable means. Between each pair of cylinders there are mounted a right and a left screw 9, 10 in bearings 11, 12 with a sprocket wheel 13, or equipment means, to rotate the screws, and to thereby force the spicules to the center of the tank, under domes 14, 15 which are provided with a pipe 17 which communicates with a pump (not shown) which by suction removes the spicules from the tank.

At the adjacent sides of each pair of cylinders, and in contact therewith, there is a chipping roller 18 having journals 19 in levers 20 pivotally secured at their opposite ends to lugs 21 attached to tank 1. Intermediate the journals 19 and lugs 21 brackets 22 are secured to tank 1 and carry adjusting rods having a screw threaded portion 23 and a jaw 24 to embrace levers 20 which are secured thereto by pins 25, the rods, levers and chipping roller are adjusted vertically by nuts having upper hexagonal parts 26 and lower spherical parts 27 fitting in spherical seats in brackets 22, the nuts being around and operating the rods so that a flexibility is obtained which enables rollers 18 to follow any inequalities in the cylinder's surface, or its ice coating, and an adjustment close to or somewhat remote from the cylinder according to the thickness of the ice coating on the cylinder. The rotation of the cylinder rotates the roller in an opposite direction, by contact with the ice coating, and the spicular surface of the roller, as seen in Figs. 4, 5, removes the ice coating in minute particles. In order to still further assure the removal of every particle of ice, additional rollers 28, of smaller diameter are provided, and adjustably suspended independent of rollers 18, by levers 29 secured between jaws 30 of levers 20 and over journals 19, the outer ends of levers 29 entering jaws 31 of suspension rods 32, the rollers 28 having journals 33 in jaws 31 and levers 29, the rods 32 having nuts 34 similar to the nuts for rods 23, and these nuts being secured in brackets 35 on tank 1. Pinions 36 are secured to journals 19, pinions 37 are secured to journals 33, and intermediate pinions 38 are secured to studs 39 in levers 29. The pinions insure the positive rotation of rollers 28 by rollers 18, in the same direction, and the independent suspension of rollers 28 assures their proper alinement to follow the cylinder's surface and its ice coating.

Above screws 9, 10 there are hoods 40, 41 to catch the spicules as they float away from the cylinders and chipping rollers and prevent them from floating to the surface of the water in the tank and away from the screws. The hoods are semicircular at their tops with perforations 42, for free water circulation, and have outwardly flaring sides extending beyond the chipping rollers, so that all the spicules or ice particles are held for the screws to convey them to the center of the tank, under a dome, where they are immediately sucked up and conveyed to the presses. By arranging the cylinders in pairs, rotating them in reverse directions, and chipping the ice particles in close proximity, and underneath the screws and their hoods, the ice particles are certain to be taken to the center of the domes, and to the pipes which convey them away, without floating upon the surface of the water in the tank where they are liable to lodge at the lower part of the domes; the sides of the domes are also made steep to avoid the liability of a lodgment of the spicules.

I claim:

1. In an ice machine, a freezing tank, a series of rotatable freezing cylinders therein, in pairs, chipping rollers suspended to engage each cylinder, located between each pair of cylinders and rotatable by the cylinders but in opposite directions, a second rotatable chipping roller for each cylinder, and means for its rotation by the first named roller, and in the same direction, but in an opposite direction to its freezing cylinder.

2. In an ice machine, a freezing tank, rotatable freezing cylinders submerged therein, a pair of chipping rollers adjustably suspended to engage each cylinder, means for the rotation of one of the rollers by its freezing cylinder, and means to rotate the second roller by the first roller, and in the same direction.

3. In an ice machine, a freezing tank, a series of rotatable freezing cylinders submerged therein, a pair of spicular surfaced chipping rollers adjustably suspended to engage each freezing cylinder, the first roller of each pair being rotated by its freezing cylinder, and means to rotate the second roller by the first roller.

4. In an ice machine, a freezing tank, a series of rotatable freezing cylinders submerged therein, a spicular surfaced chipping roller pivotally suspended to engage each freezing cylinder in manner for its adjustment to and from the freezing cylinder, a second spicular surfaced chipping roller pivotally supported by the first named roller, having adjustable means for its elevation or depression independent of the means for the same purpose for the first named roller, and means for the rotation of the second roller by the first roller.

5. In an ice machine, a freezing tank and a series of rotatable freezing cylinders therein, a spicular surfaced chipping roller to engage each cylinder, journals for the roller, levers wherein the journals are placed and means to pivotally secure the opposite ends of the levers, adjustable means to elevate and depress the levers and the roller, a second spicular surfaced roller, journals for the roller, levers wherein the journals are placed and means for their pivotal support by the first named levers, and adjustable means for the elevation and depression of the levers and the roller independent of the adjustable means for the first named roller.

6. In an ice machine, a domed freezing tank, a series of rotatable freezing cylinders therein, a pair of spicular faced rollers of different diameters actuated by each cylinder with means for their independent adjustment to their cylinders, and right and left screws to convey ice particles from the ends to the center of the freezing tank and under the center of the dome of the tank.

7. In an ice machine, a domed freezing tank, a series of rotatable freezing cylinders therein, spicular faced rollers actuated by the cylinders, right and left screws to convey ice particles from the ends to the center of the freezing tank and under the center of the dome of the tank, and hoods over the screws.

8. In an ice machine, a domed freezing tank, a series of rotatable freezing cylinders therein, spicular faced rollers actuated by the cylinders, right and left screws to convey ice particles from the ends to the center of the freezing tank and under the center of a dome of the tank, and hoods with perforated semicircular top and flaring sides covering the chipping rollers of adjacent cylinders and the intervening screws.

9. In an ice machine, a freezing tank with multiple domes, a series of reversely rotatable freezing cylinders therein, in pairs, right and left screw conveyers within the tank and above the space between each pair of cylinders, and under each dome with means for their rotation and whereby they convey the ice particles to the part of the tank under the center of one of the domes.

10. In an ice machine, the combination of a tank, a pair of freezing cylinders rotating in opposite directions, a conveyer between the cylinders, cutters operating in close proximity to the conveyer, a hood over the conveyers and cutters, and suction means for removing the spicules.

11. In an ice machine, the combination of a tank, rotatable freezing cylinders in the tank, cutters located above and between the freezing cylinders, a collector located above the cutters, and suction means for removing the ice-spicules from the tank.

12. In an ice machine, the combination of a tank, a pair of freezing cylinders in the tank and rotatable in opposite directions, cutters operating upon the upper surface of each cylinder, a collector located above and between the cylinders, and means for removing the collected spicules.

13. In an ice machine, the combination of a tank, rotatable freezing cylinders in the tank, cutters for the cylinders operated by the rotation of the cylinders, a spicule collector and means for removing the collected spicules.

14. In an ice machine, the combination of a tank, rotatable freezing cylinders in the tank, cutters, a collector near the top of the tank so that it may operate immediately below a practicable water level and between the cylinders, and means for removing the spicules.

15. In an ice machine, the combination of a tank, rotatable freezing cylinders in the tank, cutters, a spicule collector, and a dome covering the tank and communicating with a suction means to remove the spicules.

In testimony whereof I have hereunto signed this specification in the presence of two witnesses.

DANIEL L. HOLDEN.

Witnesses:
P. E. TANSLER,
JOHN KEEWITZ.